Patented June 5, 1945

2,377,787

UNITED STATES PATENT OFFICE 2,377,787

VULCANIZATION OF RUBBER

Paul C. Jones, Silver Lake, Ohio, assignor to The B. F. Goodrich Company, New York, N. Y., a corporation of New York No Drawing. Substituted for abandoned application Serial No. 487,150, May 15, 1943. This application June 29, 1944, Serial No. 542,819

16 Claims. (Cl. 260—788)

This invention relates to the vulcanization of rubber and pertains more specifically to the acceleration of vulcanization by means of unsymmetrical tertiary amines.

I have previously disclosed, in Patent No. 2,177,548 issued October 24, 1939, that certain tertiary amines of the structure $(R-S-A)_3N$, where R is an organic radical with the free valence on a carbon atom and A is an alkylene group, are effective accelerators of vulcanization. I have now discovered that tertiary amines of the structure

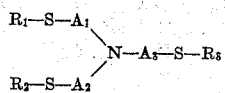

where $A_1$, $A_2$, and $A_3$ are alkylene groups and $R_1$, $R_2$, and $R_3$ is each an organic radical with the free valence on a carbon atom, and where not more than two of the $R_1$, $R_2$, and $R_3$ radicals are identical, give results different from and superior to those obtained with the amines previously disclosed by me where all three of the R radicals are the same.

Although the radicals $R_1$, $R_2$, and $R_3$ of my new amines may be any organic radicals having a free valence on a carbon atom, the preferred class comprises only those amines in which $R_1$, $R_2$, and $R_3$ are members of the class consisting of 2-thiazyl, 2-thiazolinyl, 2-oxazyl, and 2-oxazolinyl radicals. I further prefer the amines in which the radicals $R_1$, $R_2$, and $R_3$ are all different, although, as stated above, superior results may be obtained even when two of them are identical. For the sake of convenience I shall designate the amines previously disclosed by me, in which all three radicals are identical, as symmetrical amines to distinguish them from the unsymmetrical amines here disclosed.

The unsymmetrical amines of the present invention may be readily prepared from mercapto compounds by the method disclosed in my earlier Patent 2,248,356 issued July 8, 1941, although any other suitable method may also be employed.

Among the unsymmetrical amines which I have found to be excellent accelerators are the following: methylthiomethyl dimethylthiocarbamylthiomethyl ethylthioethyl amine; ethylthiomethyl isopropylthioethyl allylthiomethyl amine; cyclohexylthiomethyl phenylthiomethyl benzylthiomethyl amine; o-tolylthiomethyl methylthiomethyl alpha-naphthylthioethyl amine; methylcarbothionylthiomethyl acetylthiomethyl ethylcarbothionylthiomethyl amine; cyclohexylthioethyl bis (methylcarbothionylthiomethyl) amine; phenylcarbothionylthiomethyl diphenylthiocarbamylthioethyl 3-furoylthiomethyl amine; acetylthiomethyl methylthiomethyl benzylthioethyl amine; dimethylthiocarbamylthioethyl phenylthiomethyl methylcarbothionylthiomethyl amine; diethylthiocarbamylthiomethyl methylethylthiocarbamylthioethyl beta-naphthylthiomethyl amine; ethylthiocarbamylthiomethyl methylphenylthiocarbamylthioethyl ethylthiomethyl amine; diphenylcarbamylthioethyl bis (methylthiomethyl) amine; dicyclohexylthiocarbamylthioethyl diphenylthiocarbamylthiomethyl phenyl - beta - naphthylthiocarbamylthiomethyl amine; cyclohexylthiomethyl acetylthiomethyl diethylthiocarbamylthioethyl amine; acetylthiomethyl bis (2-thiazylthiomethyl) amine; di-alpha-naphthylthiocarbamylthioethyl phenyl-p-xenylthiocarbamylthioethyl dimethylenethiocarbamylthiomethyl amine; ethylthiomethyl bis (dimethylenethiocarbamylthioethyl) a m i n e ; phenyl - p - isopropenylphenylthiocarbamylthioethyl phenyl - p - dimethylaminophenylthiocarbamylthiomethyl phenylthiomethyl amine; phenylanilinophenylthiocarbamylthiomethyl diphenylthiocarbamylthiomethyl methylethylthiocarbamylthioethyl amine; dimethylthiocarbamylthioethyl 2-thiazylthiomethyl 2-oxazylthiomethyl amine; 2 - benzothiazylthioethyl 4,5 - dimethyl - 2 - thiazylthiomethyl cyclohexylthiomethyl amine; 2-thiazylthioethyl bis (2-thiazolinylthiomethyl) amine; 2-benzooxazylthiomethyl 2-thiazylthiomethyl 2-thiazolinylthioethyl amine; 2-benzothiazylthiomethyl 2-thiazolinylthioethyl 4,5 - dimethyl - 2 - thiazylthiomethyl amine; 2-oxazylthioethyl bis (2-benzothiazylthiomethyl) amine; 2-oxazolinylthioethyl 2-thiazylthiomethyl 2-thiazolinylthiomethyl amine; 2-oxazolinylthioethyl bis (4,5-dimethyl-2-thiazolinylthiomethyl) amine; and other similar compounds.

My new compounds possess the unusual and unexpected property of being non-scorching, i. e. having no accelerating effect upon the vulcanization of rubber at ordinary processing temperatures (about 220° F.), while at the same time being highly active at the temperatures usually employd for vulcanization (about 265° to 295° F.). Rubber compositions vulcanized in the presence of my new accelerators also exhibit remarkably low hysteresis values and low permanent set as compared with other accelerators, for example the symmetrical tertiary amines.

The following specific examples will serve to illustrate the nature of my accelerators and their effect. The following rubber composition was prepared, in which the parts are by weight:

| | |
|---|---|
| Rubber | 100.0 |
| Soft or semi-reinforcing black | 51.5 |
| Lauric acid | 3.0 |
| Zinc oxide | 10.0 |
| Antioxidant | 0.75 |
| Sulfur | 3.0 |

To separate portions of this composition there were added one part of each of the following, per 100 parts of rubber: (A) 4,5-dimethyl-2-thiazylthioethyl 2-thiazolinylthiomethyl 2-benzothiazylthiomethyl amine; (B) 2-thiazolinylthioethyl 2-thiazolinylthiomethyl 4,5-dimethyl-2-thiazylthiomethyl amine.

These compositions were then vulcanized in a press 75 minutes at 265° F. and the permanent set of the resulting compositions was measured in a Goodrich Flexometer, the construction and operation of which has been described by E. T. Lessig in Industrial and Engineering Chemistry [Anal. Edition] 9, 582 (1937). The results of the test with the two accelerators were as follows:

| Accelerator | Permanent set (%) at 212° F. |
|---|---|
| A | 10.9 |
| B | 6.7 |

Neither of the above compositions showed any evidence of vulcanization after heating 30 minutes at 220° F. There may be compared with these results those obtained by employing a symmetrical amine, 2-thiazolinylthioethyl bis (2-thiazolinylthiomethyl) amine, in a similar composition. The permanent set of this composition, measured at 212° F. was 18.8%, or 80% higher than the permanent set when accelerator A was used, and almost 200% higher than when accelerator B was used. This composition (C) also vulcanized readily at ordinary processing temperatures, as is shown by the fact that it exhibited a tensile strength of 400 lb./sq. in. after heating 30 minutes at 220° F.

The contrast between the symmetrical and unsymmetrical amines is also striking in synthetic rubber, as shown by tests on the following compositions:

| | |
|---|---|
| Rubbery copolymer of butadiene and styrene | 100.0 |
| Soft or semi-reinforcing black | 50.0 |
| Zinc oxide | 10.0 |
| Antioxidant | 1.0 |
| Sulfur | 2.0 |

To separate portions of this composition were added 1.75 parts of each of the following accelerators, per 100 parts of the rubbery copolymer: (D) 4,5-dimethyl-2-thiazylthioethyl-2-thiazolinylthiomethyl 2-benzothiazylthiomethyl amine; (E) 2-thiazolinylthioethyl 2-thiazolinythiomethyl 4,5-dimethyl 2-thiazylthiomethyl amine; and (F) 2-thiazolinylthioethyl bis (2-thiazolinylthiomethyl) amine. When tested under the same conditions as the natural rubber compositions described above, the following results were observed:

| Composition | Permanent set (%) at 212° F. |
|---|---|
| D | 11.7 |
| E | 6.4 |
| F | 15.5 |

The unsymmetrical amines were also non-scorching in synthetic rubber, as is shown by the fact that when all three compositions were heated 60 minutes at 220° F. neither (D) nor (E) showed any indication of vulcanization, while (F) had a tensile strength of 200 lbs./sq. in. The compositions vulcanized with the unsymmetrical amines also exhibited much less heat build-up on flexing than did the composition vulcanized with the symmetrical amine; this property is extremely important in any rubber article subject to repeated flexing in use, particularly in pneumatic tires, because excessive heat tends to cause deterioration of the rubber.

Similar results may be observed when other unsymmetrical amines are used with natural and synthetic rubber compositions. The accelerators may be incorporated in the rubber by any of the usual methods, that is, by mixing on a hot roll mill or in an internal mixer, or by dispersing the accelerator in the rubber latex, etc. My accelerators are preferably employed in amounts ranging from 0.1 to 5.0% by weight of the rubber. There may also be present in the rubber composition any of the usual pigments, fillers, reinforcing agents, dyes, softeners, antioxidants, or other accelerators.

As has been suggested, my new accelerators are effective not only with natural rubber or caoutchouc, but also with balata, gutta percha, reclaimed rubber, artificial rubber isomers, and synthetic rubbers which may be vulcanized with sulfur such as rubbery copolymers of butadiene with styrene, isobutylene, acrylonitrile, methyl acrylate, methyl methacrylate, or the like; the term "a rubber" as used in the claims is intended to designate all of the foregoing materials.

Compositions vulcanized with my new accelerators may be used in the manufacture of rubber articles of any description; for example, pneumatic tires and tubes, hose, belting, footwear, molded goods, latex dipped goods, and the like.

Although I have herein disclosed specific embodiments of my invention, I do not intend to limit myself solely thereto, but only as indicated by the appended claims.

This is a substitute for my prior application Serial No. 487,150, filed May 15, 1943.

I claim:

1. The method which comprises vulcanizing a rubber in the presence of an amine having the structure

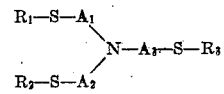

in which A₁, A₂, and A₃ are alkylene groups and R₁, R₂, and R₃ is each an organic radical with the free valence on a carbon atom, not more than two such radicals being identical.

2. The method which comprises vulcanizing rubber in the presence of an amine having the structure

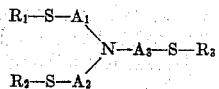

in which $A_1$, $A_2$, and $A_3$ are alkylene groups and in which $R_1$, $R_2$, and $R_3$ is each an organic radical with the free valence on a carbon atom, not more than two such radicals being identical.

3. The method which comprises vulcanizing a rubber in the presence of an amine having the structure

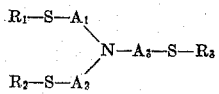

in which $A_1$, $A_2$, and $A_3$ are alkylene groups and in which $R_1$, $R_2$, and $R_3$ is each an organic radical with the free valence on a carbon atom, all three such radicals being different from each other.

4. The method which comprises vulcanizing a rubber in the presence of an amine having the structure

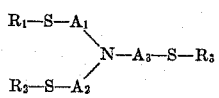

in which $A_1$, $A_2$, and $A_3$ are alkylene groups and in which $R_1$, $R_2$, and $R_3$ is each a five-membered heterocyclic radical containing three carbon atoms, one nitrogen atom, and one chalcogen atom having an atomic number less than 17, one of said carbon atoms being intermediate said nitrogen and said chalcogen atoms and attached by a double bond to said nitrogen, and the free valence of said radical being on said intermediate carbon atom, not more than two of such radicals being identical.

5. The method which comprises vulcanizing rubber in the presence of an amine having the structure

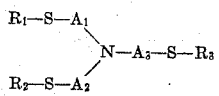

in which $A_1$, $A_2$, and $A_3$ are alkylene groups and in which $R_1$, $R_2$, and $R_3$ is each a five-membered heterocyclic radical containing three carbon atoms, one nitrogen atom, and one chalcogen atom having an atomic number less than 17, one of said carbon atoms being intermediate said nitrogen and said chalcogen atoms and attached by a double bond to said nitrogen, and the free valence of said radical being on said intermediate carbon atom, not more than two of such radicals being identical.

6. The method which comprises vulcanizing a rubber in the presence of an amine having the structure

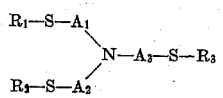

in which $A_1$, $A_2$, and $A_3$ are alkylene groups and in which $R_1$, $R_2$, and $R_3$ is each a five-membered heterocyclic radical containing three carbon atoms, one nitrogen atom, and one chalcogen atom having an atomic number less than 17, one of said carbon atoms being intermediate said nitrogen and said chalcogen atoms and attached by a double bond to said nitrogen, and the free valence of said radical being on said intermediate carbon atom, all three of such radicals being different from each other.

7. The method which comprises vulcanizing a rubber in the presence of 4,5-dimethyl-2-thiazyl thioethyl 2-thiazolinylthiomethyl 2-benzothiazyl thiomethyl amine.

8. The method which comprises vulcanizing a rubber in the presence of 2-thiazolinylthioethyl 2-thiazolinylthiomethyl 4,5-dimethyl-2-thiazyl thiomethyl amine.

9. A composition comprising a rubber vulcanized in the presence of an amine having the structure

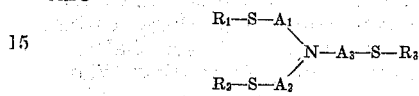

in which $A_1$, $A_2$, and $A_3$ are alkylene groups and $R_1$, $R_2$, and $R_3$ is each an organic radical with the free valence on a carbon atom, not more than two such radicals being identical.

10. A composition comprising rubber vulcanized in the presence of an amine having the structure

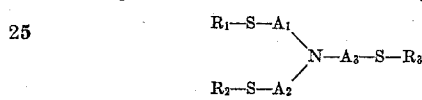

in which $A_1$, $A_2$, and $A_3$ are alkylene groups and in which $R_1$, $R_2$, and $R_3$ is each an organic radical with the free valence on a carbon atom, not more than two such radicals being identical.

11. A composition comprising a rubber vulcanized in the presence of an amine having the structure

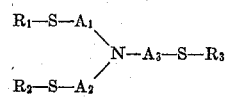

in which $A_1$, $A_2$, and $A_3$ are alkylene groups and in which $R_1$, $R_2$, and $R_3$ is each an organic radical with the free valence on a carbon atom, all three such radicals being different from each other.

12. A composition comprising a rubber vulcanized in the presence of an amine having the structure

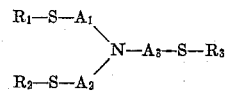

in which $A_1$, $A_2$, and $A_3$ are alkylene groups and in which $R_1$, $R_2$, and $R_3$ is each a five-membered heterocyclic radical containing three carbon atoms, one nitrogen atom, and one chalcogen atom having an atomic number less than 17, one of said carbon atoms being intermediate said nitrogen and said chalcogen atoms and attached by a double bond to said nitrogen, and the free valence of said radical being on said intermediate carbon atom, not more than two of such radicals being identical.

13. A composition comprising rubber vulcanized in the presence of an amine having the structure

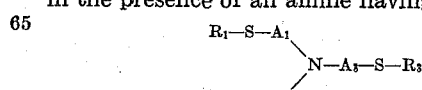

in which $A_1$, $A_2$, and $A_3$ are alkylene groups and in which $R_1$, $R_2$, and $R_3$ is each a five-membered heterocyclic radical containing three carbon atoms, one nitrogen atom, and one chalcogen atom having an atomic number less than 17, one of said carbon atoms being intermediate said nitrogen and said chalcogen atoms and attached by a double bond to said nitrogen, and the free valence of said radical being on said intermediate carbon atom, not more than two of such radicals being identical.

14. A composition comprising a rubber vulcanized in the presence of an amine having the structure

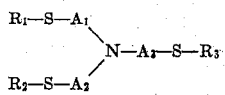

in which $A_1$, $A_2$, and $A_3$ are alkylene groups and in which $R_1$, $R_2$, and $R_3$ is each a five-membered heterocyclic radical containing three carbon atoms, one nitrogen atom, and one chalcogen atom having an atomic number less than 17, one of said carbon atoms being intermediate said nitrogen and said chalcogen atoms and attached by a double bond to said nitrogen, and the free valence of said radical being on said intermediate carbon atom, all three of such radicals being different from each other.

15. A composition comprising a rubber vulcanized in the presence of 4,5-dimethyl-2-thiazylthioethyl 2-thiazolinylthiomethyl 2-benzothiazylthiomethyl amine.

16. A composition comprising a rubber vulcanized in the presence of 2-thiazolinylthioethyl 2-thiazolinylthiomethyl 4,5-dimethyl-2-thiazylthiomethyl amine.

PAUL C. JONES.